United States Patent
Hohl

(10) Patent No.: US 10,184,428 B2
(45) Date of Patent: Jan. 22, 2019

(54) DIRECTLY-INJECTING GAS INJECTOR PROVIDING IMPROVED COOLING

(71) Applicant: Robert Bosch GmbH, Stuttgart (DE)

(72) Inventor: Guenther Hohl, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/531,198

(22) PCT Filed: Sep. 29, 2015

(86) PCT No.: PCT/EP2015/072312
§ 371 (c)(1),
(2) Date: May 26, 2017

(87) PCT Pub. No.: WO2016/082989
PCT Pub. Date: Jun. 2, 2016

(65) Prior Publication Data
US 2017/0328310 A1  Nov. 16, 2017

(30) Foreign Application Priority Data
Nov. 28, 2014 (DE) .......................... 10 2014 224 339

(51) Int. Cl.
*F01P 3/16* (2006.01)
*F02M 21/02* (2006.01)
(Continued)

(52) U.S. Cl.
CPC ....... *F02M 21/0269* (2013.01); *F02B 17/005* (2013.01); *F02M 21/0275* (2013.01);
(Continued)

(58) Field of Classification Search
CPC ........... F02M 21/0269; F02M 21/0281; F02M 21/0275; F02M 61/1846; F02M 61/08; F01P 3/16
(Continued)

(56) References Cited

U.S. PATENT DOCUMENTS

| 4,574,754 A | 3/1986 | Rhoades, Jr. |
| 2001/0025892 A1 | 10/2001 | McCoy et al. |
| 2005/0082393 A1 | 4/2005 | Borissov |

FOREIGN PATENT DOCUMENTS

| DE | 1259634 B | 1/1968 |
| JP | 3883813 B2 | 2/2007 |

OTHER PUBLICATIONS

International Search Report dated Jan. 27, 2016 of the corresponding International Application PCT/EP2015/072312 filed Sep. 29, 2015.

*Primary Examiner* — Hai Huynh
(74) *Attorney, Agent, or Firm* — Norton Rose Fulbright US LLP; Gerard Messina

(57) ABSTRACT

A gas injector for injecting a gaseous fuel directly into a combustion chamber of an internal combustion engine includes a valve-closing element for releasing and sealing a through opening at a sealing seat; a shielding element, which is situated at an end of the valve-closing element on a side of the combustion chamber and which shields the valve-closing element and the sealing seat with respect to the combustion chamber; and a cooling ring having a first contact area designed for direct contact with the shielding element and a second contact area designed for direct contact with a component of the internal combustion engine, in particular with a cylinder head.

13 Claims, 2 Drawing Sheets

(51) Int. Cl.
*F02B 17/00* (2006.01)
*F02M 61/08* (2006.01)
*F02M 61/18* (2006.01)

(52) U.S. Cl.
CPC ......... *F02M 21/0281* (2013.01); *F02M 61/08* (2013.01); *F02M 61/1846* (2013.01); *Y02T 10/32* (2013.01)

(58) Field of Classification Search
USPC .................. 123/41.82 R, 41.85, 470, 525
See application file for complete search history.

DIRECTLY-INJECTING GAS INJECTOR PROVIDING IMPROVED COOLING

CROSS-REFERENCE TO RELATED APPLICATIONS

The present application is the national stage of International Pat. App. No. PCT/EP2015/072312 filed Sep. 29, 2015, and claims priority under 35 U.S.C. § 119 to DE 10 2014 224 339.4, filed in the Federal Republic of Germany on Nov. 28, 2014, the content of each of which is incorporated herein by reference in its entirety.

FIELD OF THE INVENTION

The present invention relates to a directly-injecting gas injector for the injection of a gaseous fuel directly into a combustion chamber of an internal combustion engine, the gas injector providing good cooling.

BACKGROUND

In addition to liquid fuels, gaseous fuels such as natural gas or hydrogen have been finding increasing use in the automotive field over the past few years.

SUMMARY

A particular problem of directly-injecting gas injectors is the sealing when the gas injector is closed. A suitable sealing material at the sealing seat would be an elastomer, for example, which, however, is currently not used for directly injecting gas injectors because of its limited temperature resistance and a high susceptibility to wear. In addition to the excellent sealing properties of the elastomer, its outstanding damping characteristics during the closing operation are also advantageous.

In contrast, embodiments of the present invention have the advantage that a cooling ring is provided, which is able to significantly reduce a temperature in the region of the gas injector on the side of the combustion chamber. This also provides the option of using elastomer seals in the region of the sealing seat of the gas injector, especially in the case of outwardly opening gas injectors. Furthermore, a shielding element is provided according to the present invention, which shields the end of a valve-closing element, such as a valve needle, on the side of the combustion chamber, as well as the sealing seat, from the combustion chamber. The cooling ring according to the present invention includes a first contact area, which is designed for direct contact with the shielding element, and a second contact area, which is designed for direct contact with a component of the internal combustion engine such as a cylinder head. This allows for a direct heat transfer from the shielding element to the cooling ring and from the cooling ring to the cylinder head. Heat conduction between the components is able to be realized in the process, especially by the direct contact between the components. As a result, heat from the shielding element, which is directly exposed to the hot combustion chamber gases, is able to be conducted to the cylinder head via the cooling ring. Thermal loading of other components of the gas injector, in particular loading of the sealing seat and the valve-closing element, is significantly reduced as a result. Because of the heat dissipation, the possibility of a spontaneous ignition in excessively hot regions of the gas injector is additionally avoided.

Preferably, the cooling ring is disposed on the gas injector in such a way that the cooling ring covers the sealing seat in the radial direction of the gas injector. This particularly prevents the temperature at the sealing seat from becoming too high, so that elastomer seals, which do not exhibit the same high temperature resistance as metal seals, can preferably be used at the sealing seat as well. The use of elastomer seals in gas injectors is especially preferred because elastomer seals are better able to seal gases than metal seals, and because a more optimal damping effect is provided during the closing operation.

In addition, the cooling ring preferably has profiling on an outer periphery and/or on an inner periphery. In particular tolerances that can occur in the components of the gas injector or on the cylinder head due to production tolerances thus are able to be compensated for with the aid of the cooling ring. The installation of the cooling ring is made considerably easier as a result. Despite the profiling, adequate contact area still exists between the cooling ring and the shielding element as well as between the cooling ring and the cylinder head so that a sufficient quantity of heat is able to be transferred from the shielding element to the cylinder head.

It is especially preferred that the cooling ring is connected to the shielding element with the aid of a first welded joint. The welded joint does not interrupt the heat conduction between the shielding element and cooling ring. In addition, the cooling ring is preferably connected to a valve body of the gas injector by a second welded joint. Thus, the cooling ring is preferably fixed in place on the gas injector with the aid of two welded joints which do not negatively affect the heat conduction through the cooling ring. The welded joints are preferably metallic welded joints.

To make the installation especially uncomplicated, the cooling ring is slotted, preferably with a slot extending in the ring in the axial direction of the gas injector, i.e., parallel to the center longitudinal axis of the gas injector.

In addition, the gas injector preferably includes a sealing element, and the cooling ring has a third contact area which is designed for contact with the sealing element. The sealing element seals the gap between the gas injector and the cylinder head and is preferably situated on the side of the cooling ring that faces away from the combustion chamber. The sealing element is a Teflon ring, for example.

According to another preferred development of the present invention, the sealing seat of the gas injector has an elastomer seal. It is especially preferred that the elastomer seal is provided in a valve body of the gas injector, in a correspondingly developed groove.

The profiled cooling ring especially preferably includes a toothed profile at the outer periphery and/or at the inner periphery. The toothed profile is preferably square in cross-section. As an alternative, the cooling ring is a crinkled spring washer, which is developed in such a way that the crinkled spring washer alternately makes contact with the cylinder head and a component that is disposed radially within the cooling ring, in particular a valve body, of the gas injector.

In addition, the cooling ring is preferably made from a metallic material.

The valve-closing element is preferably provided as an outwardly opening valve-closing element, i.e., the valve-closing element opens in the direction of the combustion chamber. In addition, a plurality of jet orifices are provided in the shielding element, through which the gaseous fuel is able to be injected directly into the combustion chamber. Thus, a desired spray pattern is able to be individually realized in the shielding element through the arrangement of the jet orifices in the shielding element, so that the gas injector can have a multitude of identical components for a variety of different customers. The gas jet is therefore individually adaptable without having to modify other parts of the gas injector.

In addition, the present invention relates to an internal combustion engine, which includes a combustion chamber and a gas injector as described herein, the gas injector being disposed directly at the combustion chamber in order to inject gaseous fuel directly into the combustion chamber.

Furthermore, the gas injector is preferably an outwardly opening gas injector.

An exemplary embodiment of a gas injector according to the present invention is described in detail in the following text with reference to the figures.

DETAILED DESCRIPTION

Figure 1:
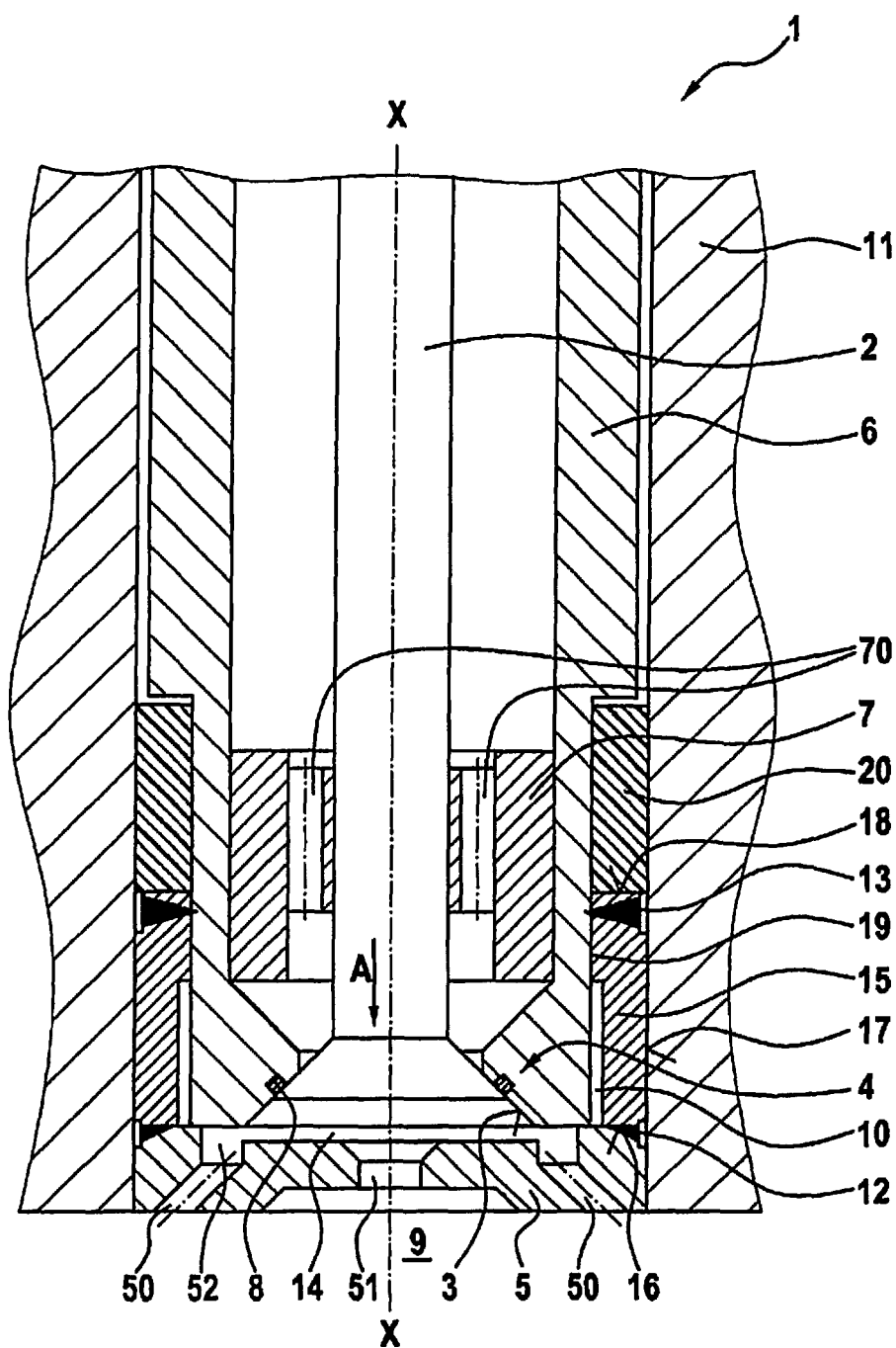
FIG. 1 a schematic sectional view of a gas injector according to a first example embodiment of the present invention.
Figure 2:
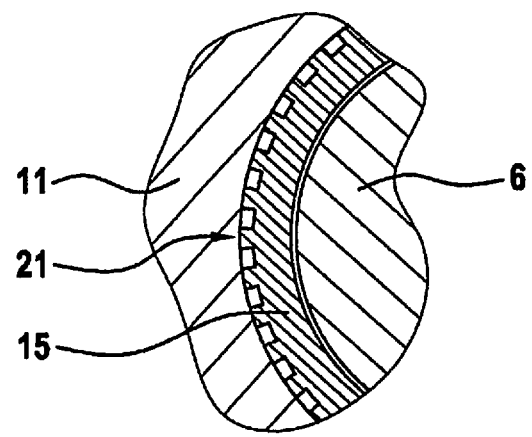
FIG. 2 a schematic sectional view of a cooling ring of FIG. 1, according to an example embodiment of the present invention.

A gas injector 1 according to a preferred exemplary embodiment of the present invention is shown in detail with reference to FIGS. 1 and 2. As can be gathered from FIG. 1, gas injector 1 includes a valve-closing element 2, which is a valve needle in this particular exemplary embodiment. Valve-closing element 2 releases and closes a through opening 3. FIG. 1 depicts the closed state of the gas injector. Gas injector 1 is an outwardly opening injector.

In addition, gas injector 1 includes a sealing seat 4, which is provided between valve-closing element 2 and a valve body 6. Sealing seat 4 is a conical sealing seat.

Sealing seat 4 includes an elastomer seal 8, which is situated in a groove in valve body 6.

Moreover, a guide component 7 is provided, which has through openings 70 for the passage of the gaseous fuel. Guide component 7 guides valve-closing element 2.

As can be gathered from FIG. 1, gas injector 1 is situated directly at combustion chamber 9. This allows gas injector 1 to inject gaseous fuel directly into combustion chamber 9.

In addition, gas injector 1 includes a shielding element 5, which is a disk-shaped element in this particular exemplary embodiment. Shielding element 5 has a plurality of jet orifices 50, which generate a predefined spray in combustion chamber 9 during the injection of the fuel. Furthermore, a central opening 51 is provided in shielding element 5. Jet orifices 50 are connected to one another via an annular groove 52 in shielding element 5.

Moreover, gas injector 1 includes a cooling ring 15. Cooling ring 15 is situated at the outer periphery of gas injector 1 and is in contact with shielding element 5 as well as a cylinder head 11. For this purpose, cooling ring 15 has a first contact area 16, which is designed for contact with shielding element 5. Moreover, cooling ring 15 has a second contact area 17, which is designed for contact with cylinder head 11.

According to the present invention, heat in combustion chamber 9 that is transmitted directly to shielding element 5 is therefore able to be transferred, through the contact with cooling ring 15, to cooling ring 15 and from there, to cylinder head 11. To prevent the transfer of the heat also to valve body 6, a gap 10 is provided between cooling ring 15 and valve body 6. A contact area 19 with respect to valve body 6 is provided only at an end of cooling ring 15 that faces away from the combustion chamber. Also provided in this contact area 19 is a second welded joint 13 by way of which cooling ring 15 if fixed in place on valve body 6.

In addition, gas injector 1 includes a sealing element 20 in the form of a Teflon ring, which is disposed on the side of cooling ring 15 that faces away from the combustion chamber. Cooling ring 15 has a third contact area 18, which is in contact with sealing element 20. Sealing element 20 seals the gap between gas injector 1 and cylinder head 11.

Sealing element 20 is situated in a recess of valve body 6.

As can be gathered from FIG. 1, cooling ring 15 completely covers sealing seat 4 in the radial direction of gas injector 1.

As is also clear from FIG. 1, an interspace 14 is provided between shielding element 5 and the end of valve-closing element 2 on the side of the combustion chamber. Interspace 14 is selected in such a way that the volume of interspace 14 is as small as possible. A distance between the end of valve-closing element 2 on the side of the combustion chamber and shielding element 5 is selected as small as possible. Since significantly fewer deposits occur with gaseous fuels than with liquid fuels, a very small distance can be selected.

To open the gas injector, valve-closing element 2 is moved in the direction of arrow A with the aid of an actuator (not shown). In response, valve-closing element 2 lifts off from sealing seat 4 so that gaseous fuel is able to be injected into combustion chamber 9 via interspace 14 and jet orifices 50. The gas jet is able to be individually adapted to the combustion chamber via jet orifices 50 without the need to modify the outwardly opening valve-closing element 2 for this purpose. The variance lies only in the shielding element. In particular, it is also possible to realize an injection angle that is otherwise not possible in an outwardly opening valve-closing element.

When the gas injector is closed again after the injection has taken place, which can be accomplished with the aid of a restoring spring, for example, the fuel continues to flow through jet orifices 50 on account of its inertia. Fresh air is thereby pulled out of the combustion chamber through central opening 51, and interspace 14 is flushed. Because of the high jet pulse during the injection process, a lean zone is additionally produced at the tip of the valve-closing element, which is pressed back into interspace 14 again in a compression phase of the internal combustion engine. This prevents gaseous fuel from collecting in interspace 14.

Because of the use of shielding element 5, it is therefore possible to keep heat away from valve-closing element 2 and away from sealing seat 4 on the one hand. On the other hand, shielding element 5 needs to be configured only with regard to high temperatures but not for mechanical loading, e.g., resulting from contact with the valve-closing element or because of a sealing seat. Shielding element 5 can thus be optimized from the aspect of thermal technology. In addition, shielding element 5 is able to be produced individually for different internal combustion engines and installed on gas injector 1.

In addition, undesired overloading of the elastomer seal during the closing operation is avoided in that elastomer seal 8 is disposed in the groove of valve body 6.

According to the present invention, the heat from combustion chamber 9 is thus able to be transferred directly to cylinder head 11 via shielding element 5 and cooling ring 15. This can take place through thermal conduction inasmuch as cooling ring 15 is in direct contact both with shielding element 5 and cylinder head 11. This also makes it possible to use an elastomer seal 8 at sealing seat 4 because the temperatures are able to be reduced significantly, especially at valve body 6 and on valve-closing element 2. In addition, the thermal linkage of shielding element 5 to cylinder head 11 according to the present invention ensures that undesired spontaneous ignitions in hot regions are avoidable. As a result, an outwardly opening gas injector is able to be realized according to the present invention, which provides excellent tightness in the closed state, in particular on account of the use of elastomer seal 8.

FIG. 2 shows a section through cooling ring 15. As can be gathered from FIG. 2, cooling ring 15 has rectangular profiling 21 at an outer periphery. The inner periphery of cooling ring 15 is provided without profiling.

Figure 3:
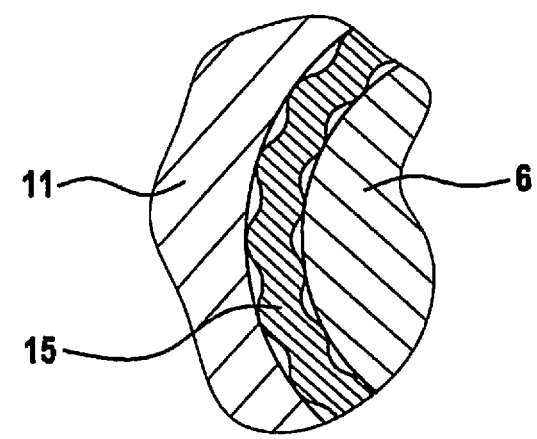
FIG. 3 a schematic sectional view of a cooling ring, according to an alternative example embodiment of the present invention.

FIG. 3 shows an alternative development of cooling ring 15, which is developed as a crinkled spring washer in FIG. 3. The crinkled spring washer alternately contacts cylinder head 11 and valve body 6.

What is claimed is:

1. A gas injector for injecting a gaseous fuel directly into a combustion chamber of an internal combustion engine, comprising:
    a valve-closing element for releasing and closing a through opening at a sealing seat;
    a shielding element at an end of the valve-closing element on a side of the combustion chamber, wherein the shielding element shields the valve-closing element and the sealing seat with respect to the combustion chamber; and
    a cooling ring made of metal, the cooling ring including (a) a first contact area designed for direct contact with the shielding element and (b) a second contact area designed for direct contact with a component of the internal combustion engine, in particular a cylinder head.

2. The gas injector of claim 1, wherein the cooling ring covers the sealing seat in a radial direction of the gas injector.

3. The gas injector of claim 1, wherein an outer periphery or inner periphery of the cooling ring has a profiling.

4. The gas injector of claim 1, wherein the cooling ring is connected to the shielding element with a welded joint.

5. The gas injector of claim 1, wherein the cooling ring is connected to a valve body with the aid of a welded joint.

6. The gas injector of claim 1, wherein the sealing seat includes an elastomer seal.

7. The gas injector of claim 1, wherein the valve-closing element is provided as an outwardly opening element, and a plurality of jet orifices, through which the gaseous fuel is able to be injected directly into the combustion chamber, are provided in the shielding element.

8. The gas injector of claim 1, wherein the component is a cylinder head.

9. A gas injector for injecting a gaseous fuel directly into a combustion chamber of an internal combustion engine, comprising:
    a valve-closing element for releasing and closing a through opening at a sealing seat;
    a shielding element at an end of the valve-closing element on a side of the combustion chamber, wherein the shielding element shields the valve-closing element and the sealing seat with respect to the combustion chamber; and
    a cooling ring including (a) a first contact area designed for direct contact with the shielding element and (b) a second contact area designed for direct contact with a component of the internal combustion engine, in particular a cylinder head;
    wherein an outer periphery or inner periphery of the cooling ring has a tooth shaped profile, the tooth shaped profile including a plurality of spaced teeth.

10. A gas injector for injecting a gaseous fuel directly into a combustion chamber of an internal combustion engine, comprising:
    a valve-closing element for releasing and closing a through opening at a sealing seat;
    a shielding element at an end of the valve-closing element on a side of the combustion chamber, wherein the shielding element shields the valve-closing element and the sealing seat with respect to the combustion chamber; and
    a cooling ring including (a) a first contact area designed for direct contact with the shielding element and (b) a second contact area designed for direct contact with a component of the internal combustion engine, in particular a cylinder head;
    wherein the cooling ring is a crinkled spring washer.

11. A gas injector for injecting a gaseous fuel directly into a combustion chamber of an internal combustion engine, comprising:
    a valve-closing element for releasing and closing a through opening at a sealing seat;
    a shielding element at an end of the valve-closing element on a side of the combustion chamber, wherein the shielding element shields the valve-closing element and the sealing seat with respect to the combustion chamber; and
    a cooling ring including (a) a first contact area designed for direct contact with the shielding element and (b) a second contact area designed for direct contact with a component of the internal combustion engine, in particular a cylinder head;
    wherein the cooling ring is slotted in an axial direction of the gas injector.

12. A gas injector for injecting a gaseous fuel directly into a combustion chamber of an internal combustion engine, comprising
    a valve-closing element for releasing and closing a through opening at a sealing seat;
    a shielding element at an end of the valve-closing element on a side of the combustion chamber, wherein the shielding element shields the valve-closing element and the sealing seat with respect to the combustion chamber;
    a cooling ring including (a) a first contact area designed for direct contact with the shielding element and (b) a second contact area designed for direct contact with a component of the internal combustion engine, in particular a cylinder head; and
    a sealing element made of Teflon, wherein the cooling ring includes a third contact area contacting with the sealing element.

13. An internal combustion engine arrangement comprising:
    a combustion chamber;

a gas injector situated directly at the combustion chamber in order to inject gaseous fuel directly into the combustion chamber, wherein the gas injector includes:
  a valve-closing element for releasing and closing a through opening at a sealing seat;
  a shielding element at an end of the valve-closing element on a side of the combustion chamber, wherein the shielding element shields the valve-closing element and the sealing seat with respect to the combustion chamber; and
  a cooling ring made of metal, the cooling ring including (a) a first contact area designed for direct contact with the shielding element and (b) a second contact area designed for direct contact with a component of the internal combustion engine.

\* \* \* \* \*